Feb. 2, 1943.   W. H. FRANK ET AL   2,310,024
ELECTRICAL DISTRIBUTION SYSTEM
Filed July 28, 1941   3 Sheets-Sheet 1

INVENTORS
William H. Frank
Arthur S. Bassette
BY
Daniel G. Cullen
ATTORNEY.

William H. Frank
Arthur S. Bassette
INVENTORS

BY Daniel G. Cullen
ATTORNEY.

Feb. 2, 1943.                W. H. FRANK ET AL                2,310,024
                      ELECTRICAL DISTRIBUTION SYSTEM
                    Filed July 28, 1941        3 Sheets-Sheet 3
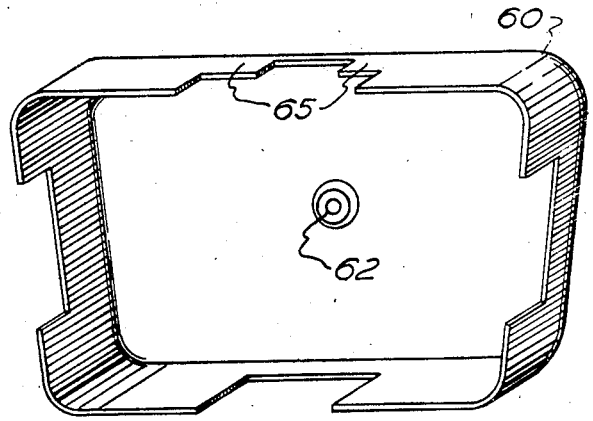
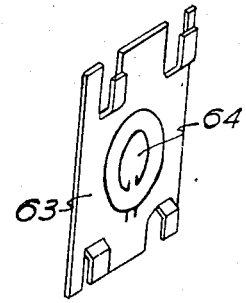
Fig. 13                Fig. 14.
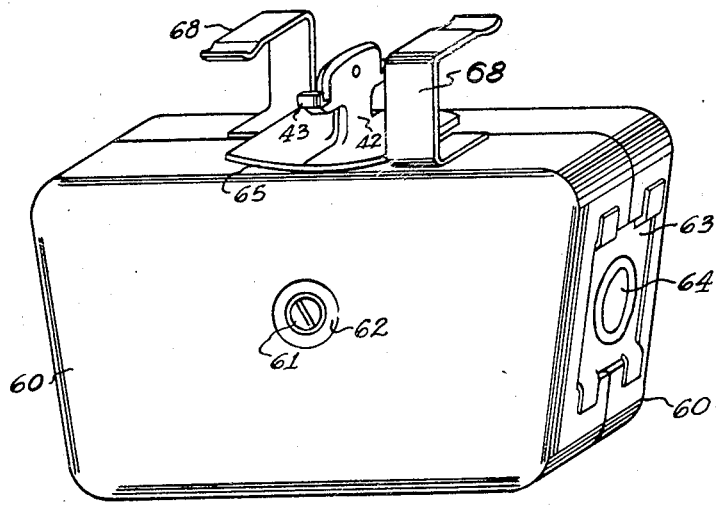
Fig. 15.
INVENTORS
William H. Frank
& Arthur S. Bassette
BY
Daniel E. Cullen
ATTORNEY.

Patented Feb. 2, 1943

2,310,024

UNITED STATES PATENT OFFICE 2,310,024

ELECTRICAL DISTRIBUTION SYSTEM

William H. Frank and Arthur S. Bassette, Detroit, Mich., assignors to Bulldog Electric Products Company, Detroit, Mich., a corporation of West Virginia Application July 28, 1941, Serial No. 404,288

2 Claims. (Cl. 173—361)

This application relates to detachable collectors suitable for use with slotted tubes of the character shown in Patent No. 2,134,753 of November 1, 1938. That patent shows a bus tube and a twist-out detachable non-slidable connector type collector for use therewith. This application discloses a novel form of connector type collector for use with the same bus tube, and also to appurtenances for use with such collector. The type here shown is also a non-slidable or connector type collector.

For an understanding of the collector here shown, reference should be had to the description which follows and to the appended drawings. In these drawings.

Figure 10:
Figure 11:
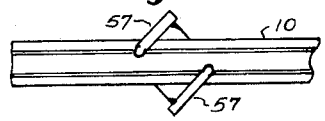
Figure 12:
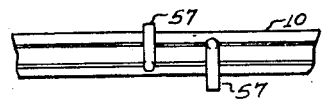

Figs. 10, 11, and 12 show the use of the twist lock or hook attachment for detachably interlocking the connector to a duct, thus preventing accidental removal of a connector from its duct;

Figs. 13 and 14 show an outlet box for use with the connector, if desired;

Fig. 15 shows the outlet box in use with a connector, the box being equipped with a twist lock attachment.

Figure 16:
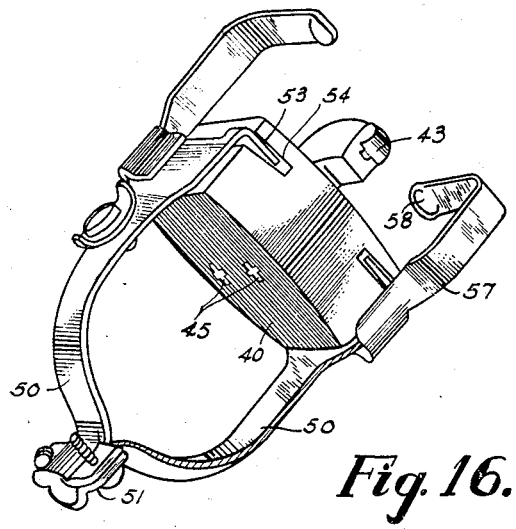
Figure 6:
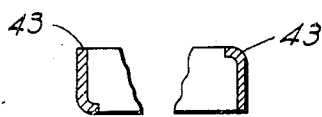
Fig. 6 is a fragmentary section on line 6—6, Fig. 4.

Fig. 16 shows the connector in perspective.

The drawings show a bus tube consisting of a slotted tube 10 of sheet metal having track-forming beads 11 and bus bars 12 insulatedly supported in the tube. A narrow slot 14 communicates the interior of the tube with the outside. In this tube may be placed a collector which may be of the connector form, normally intended to be placed in the duct and left where so placed.

The connector form of collector

Figure 1:
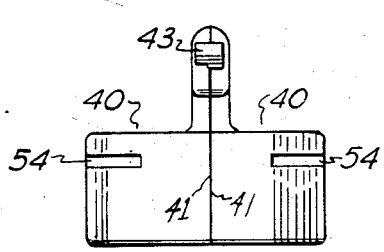
Figs. 1 and 2 are side and end views of a non-slidable or connector type collector.
Figure 2:
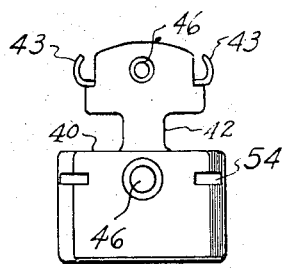
Figure 3:
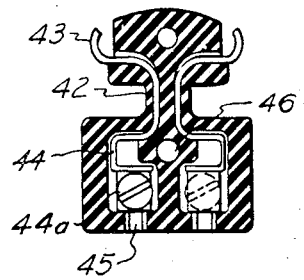
Figs. 3 and 4 show terminal type and receptacle type connectors, respectively.
Figure 4:
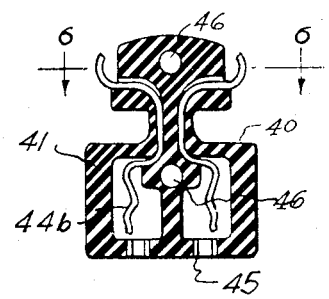
Figure 5:
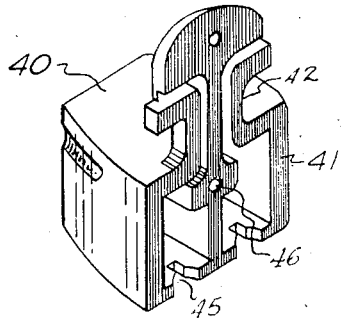
Fig. 5 shows a body part of the connector.

Figs. 1-6 show a connector or non-slidable form of collector having two identical molded portions, forming a body 40, the two parts mating on the complementing faces 41. Suitable grooves and recesses in such mating faces receive edges of contact straps 42, terminating in bus bar engaging contact portions 43 and in ends 44. Contact ends 43 are formed to rock or spring slightly in the grooves of the body portions, as shown in Figs. 3-4.

The ends 44 may be formed as binding posts 44a for wire terminals to form a terminal type connector, or the ends 44 may be formed as contacts 44b for cooperating with prongs of cap plugs, to form a receptacle type connector, the prongs being in a sense, conductor terminals of a branch cord. Suitable slots or ways 45 in the lower edges of the body portions 40 open into the recesses containing the binding posts 44a or the contacts 44b for the reception of wire terminals or prongs of a cap plug. Alined holes 46 of the body portions 40 receive long rivets for holding the body portions together and to form a complete connector.

Thus, from two body portions 40, and two contact straps 42, which may be of the terminal type having binding posts 44a or of the receptacle type having contacts 44b, it is possible to form either a terminal type connector or a receptacle type connector, as desired.

Accessories

Figure 7:
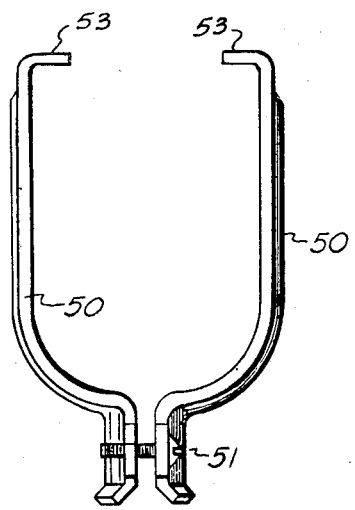
Fig. 7 shows a cord support or clamp for use with the connector, if desired.
Figure 8:
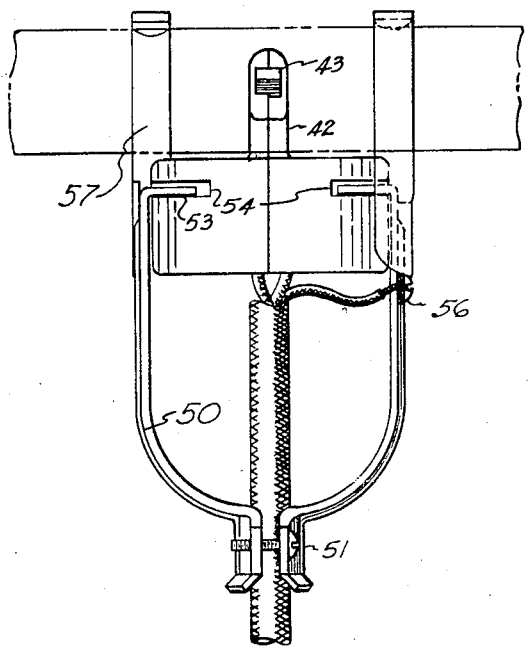
Figs. 8 and 9 show the cord support as used on a connector; these figures also show the cord support equipped with a twist lock or hook attachment; or overhead support bracket.
Figure 9:
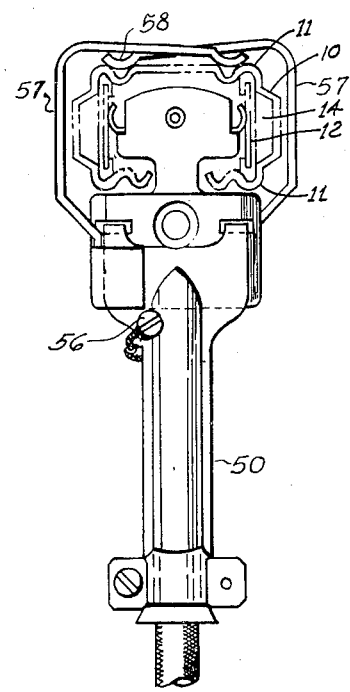

Fig. 7 shows a cord support or clamp or strain relief means which may be utilized in connection with the connector of Figs. 1-6, as in Figs. 8-9. The cord support includes two straps 50 having ends 51 formed for clamping a branch cord 52 between them and having hook ends 53 adapted to hook into slots 54 in the outside of the connector body 40.

The cord supports 50 and grooves 54 cooperate to interlock the connector and the cord support, whereby load on the latter may be distributed thru and absorbed by the former, and also cooperate to hold the parts of the former together, thus helping the rivets in holes 46 of the connector.

When the cord support is used with a connector, reliance may be placed, for grounding the connector to the tube, upon L shaped hooks 57 (Figs. 8-9) forming a support bracket which may be attached to the cord support straps 50 for embracing the tube and thus preventing the connector from being pulled or twisted out of the tube unintentionally, and for protecting the small part or head of the connector. The hooks 57 embrace the tube, as shown in Figs. 10 to 12, to hook over it when the connector is inserted in the tube with the upper end of its body aligned with the slot and then twisted 90°, substantially as indicated.

The cord support 50 and the overhead support bracket 57 forms a unitary assembly, because the parts 50 and 57 are intersecured, and may be applied as a unit, to a connector. When connected, parts 40—50—57 will form a unitary assembly which may be applied to a tube, as a unit. The bracket 50 will support the load of the cord from the tube, freeing the connector of any stress and it will support the connector in the tube and the bracket will snap lock to the tube, by virtue of the beads 58 on the hooks snapping into grooves in the top wall of the tube, as shown in Fig. 9.

Figs. 13 to 14 show a cord clamp in the form of an outlet box consisting of two complementary portions 60 which may be connected by a bolt 61 passed through their holes 62 and having openings adapted to be closed by closure plates 63 provided with knockouts 64. A branch load cord may be anchored to the box by suitable means. A box thus formed may be associated with a connector by inserting the corners 65 of the top opening of the box into the slots 54 of the connector body 40.

The outlet box form, like the other form of cord support, interlocks itself to the connector and helps hold the parts of the latter together.

When the box form of cord support is used with a connector it may also be equipped with L-shaped hooks 68 similar to those shown at 57 for use with the cord support 50 for similar purposes.

When the box is used with a connector, hooks 68 establish a ground connection between the tube and a ground wire connected to the box.

We claim:

1. For use with a hollow tube containing bus bars and having an elongated narrow slot providing an entrance into the tube, a connector comprising an insulating body adapted to be disposed outside the tube and having a neck projecting therefrom adapted to be disposed within and remain within the tube slot and so formed that any transverse diameter is smaller than the width of the slot, the connector having a wide but thin head provided with contacts on its most widely spaced surfaces for engaging the bus bars of the tube when the head is within the tube, the head being thin enough so that it may enter the tube or leave it thru the slot, and being wide enough so that when the head is within the tube, and positioned to be transverse of the slot so as to be non removable from the tube, the head contacts will engage the bus bars, the connector containing conducting straps within the body and having ends formed for electrical contact with terminals of a conductor of a branch cord outside the connector, the straps making electrical contact with the head contacts, and a support bracket comprising hooks detachably but rigidly interlocked to the connector body and formed to embrace the tube for anchoring the connector to the tube and for transferring any load on the connector body, from the cord, to the tube.

2. For use with a hollow tube containing bus bars and having an elongated narrow slot providing an entrance into the tube, a connector comprising an insulating body adapted to be disposed outside the tube and having a neck projecting therefrom adapted to be disposed within and remain within the tube slot and so formed that any transverse diameter is smaller than the width of the slot, the connector having a wide but thin head provided with contacts on its most widely spaced surfaces for engaging the bus bars of the tube when the head is within the tube, the head being thin enough so that it may enter the tube or leave it thru the slot, and being wide enough so that when the head is within the tube, and positioned to be transverse of the slot so as to be non removable from the tube, the head contacts will engage the bus bars, the connector containing conducting straps within the body and having ends formed for electrical contact with terminals of a conductor of a branch cord outside the connector, the straps making electrical contact with the head contacts, and a cord clamp bracket strain relief means detachably interlocked to the connector for anchoring a cord end and for relieving any strain on the cord conductor terminals and having hooks detachably but rigidly interlocked to the connector body and formed to embrace the tube for anchoring the connector to the tube and for transferring any load on the connector body, from the cord to the tube, the cord clamp and bracket means being integrally formed so as to be applicable, as a unit, to a connector, the connector and the cord clamp bracket means together forming a device applicable, as a unit, to a tube.

WILLIAM H. FRANK.
ARTHUR S. BASSETTE.